United States Patent [19]
Check

[11] Patent Number: 6,018,143
[45] Date of Patent: Jan. 25, 2000

[54] HEAT THERMAL BAG

[76] Inventor: Robert Check, 446 Shrewsbury Dr., Clarkston, Mich. 48348

[21] Appl. No.: 09/207,378

[22] Filed: Dec. 8, 1998

Related U.S. Application Data

[63] Continuation-in-part of application No. 08/883,866, Jun. 27, 1997, abandoned, which is a continuation of application No. 08/510,788, Aug. 3, 1995, abandoned.

[51] Int. Cl.[7] ............................... H05B 3/36; A21B 1/52
[52] U.S. Cl. ......................... 219/387; 219/529; 219/549
[58] Field of Search ..................... 219/385–387, 219/528, 529, 549; 383/14, 97, 101, 110

[56] References Cited

U.S. PATENT DOCUMENTS

| | | | |
|---|---|---|---|
| 3,428,103 | 2/1969 | Walsh | 383/97 |
| 4,344,534 | 8/1982 | Sutton. | |
| 4,476,989 | 10/1984 | Larsen. | |
| 4,523,078 | 6/1985 | Lehmann | 219/202 |
| 4,537,313 | 8/1985 | Workman. | |
| 4,679,242 | 7/1987 | Brockhaus. | |
| 4,810,859 | 3/1989 | Anabtawi et al. | 219/535 |
| 5,078,050 | 1/1992 | Smith. | |
| 5,128,522 | 7/1992 | Marx et al. | 219/385 |
| 5,329,096 | 7/1994 | Suematsu | 219/528 |
| 5,404,808 | 4/1995 | Smith | 99/483 |
| 5,408,068 | 4/1995 | Ng. | |
| 5,444,228 | 8/1995 | Gelus | 219/549 |
| 5,454,471 | 10/1995 | Norvell | 206/545 |
| 5,750,962 | 5/1998 | Hyatt | 219/387 |

FOREIGN PATENT DOCUMENTS

| | | | |
|---|---|---|---|
| 2493090 | 4/1982 | France. | |
| 2521408 | 8/1983 | France | 219/385 |
| 4221455 | 1/1994 | Germany. | |
| 2127678 | 3/1984 | United Kingdom. | |

*Primary Examiner*—Joseph Pelham
*Attorney, Agent, or Firm*—Reising, Ethington, Barnes, Kisselle, Learman & McCulloch, PC

[57] ABSTRACT

A portable, thermal bag for containing a food product, such as pizza. The bag has top and bottom panels and is closed along both sides and at the rear end. The front end is open to permit insertion and removal of the food product. The top and bottom panels each have an outer cover layer and an inner cover layer, and an electric resistance wire between the cover layers. The resistance wires may be plugged into the cigarette lighter of a delivery vehicle to keep the food product warm. A thermostat is placed in the center of the top panel to control the temperature. The bag has a quick release connector which may also be plugged into a low voltage transformer in a restaurant where several bags may be kept before being used to carry a pizza in a delivery vehicle.

5 Claims, 5 Drawing Sheets

HEAT THERMAL BAG

REFERENCE TO RELATED APPLICATION

This application is a continuation in-part of application Ser. No. 08/883,866 filed Jun. 27, 1997, now abandoned, which was a continuation of application Ser. No. 08/510,788 filed Aug. 3, 1995, now abandoned.

FIELD OF THE INVENTION

This invention relates generally to thermal bags and refers more particularly to a heated thermal bag for carrying a food product such as pizza.

BACKGROUND AND SUMMARY

Bags for pizza and similar food products have been in use for several years and some are insulated to keep the food product warm. However, even when insulated, these bags generally fail to keep the food product from getting cold before it is delivered. What is needed is a thermal bag which is well insulated and has a built-in heater for maintaining the contents of the bag at the desired temperature during the actual delivery process.

In accordance with the present invention, the thermal bag has top and bottom panels and is closed at the rear end and at the sides, but has an opening at the front for the insertion and removal of a food product. The bag preferably is insulated and has a built-in heating device with a thermostat to maintain the bag at the desired temperature.

Preferably, the thermostat is placed in the center of the top panel for most effective use. The heating device can be plugged into the cigarette lighter of the delivery vehicle so that the bag remains heated up to the point of actual delivery. Thus, the pizza or other food product in the bag will remain hot no matter what weather conditions, traffic conditions or delivery distance prevail. A thermofuse is preferably employed to prevent overheating as might occur as a result of failure of the thermostat.

Preferably, the bag is made of soft, flexible, multi-layer material having inner and outer sheets of heavy duty Nylon, for example, and with the heating device provided with heating elements in both the top and bottom panels. The heating device is an integral part of the bag and will not interfere with the insertion and/or removal of the food product.

The material of the bag itself is preferably of such an extremely flexible nature that is may be turned inside out for cleaning the inside of the bag.

One object of this invention is to provide a thermal bag having the foregoing features and capabilities.

Another object is to provide a thermal bag which is of simple construction, is rugged and durable in use, and is capable of being inexpensively manufactured.

Other objects, features and advantages of the invention will become more apparent as the following description proceeds, especially when considered with the accompanying drawings.

DETAILED DESCRIPTION OF THE PREFERRED EMBODIMENT

Figure 1:
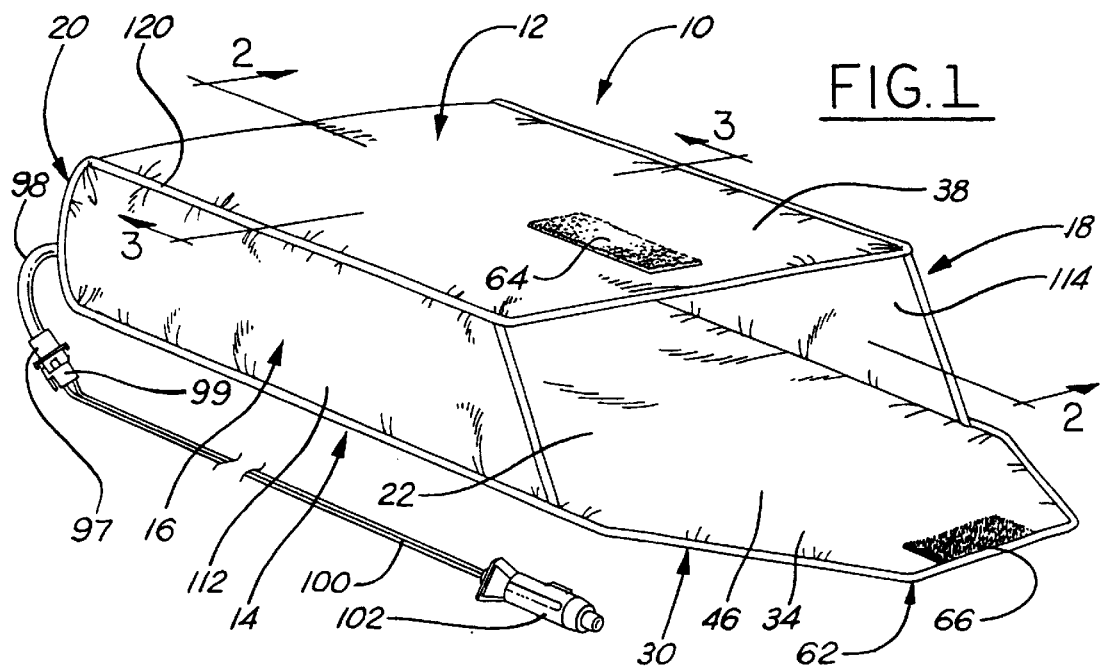
FIG. 1 is a perspective view of a thermal bag constructed in accordance with this invention, with a flap at one end shown in open position.

Referring now more particularly to the drawings, the thermal bag 10 has top and bottom panels 12 and 14. Side panels 16 and 18 close the sides of the bag. The bag is closed at the rear by a rear panel 20 and has an opening 22 at the front. The panels 12, 14, 16, 18 and 20 are preferably rectangular, as shown.

The top and bottom panels 12 and 14 and the rear panel are formed from one continuous multi-layer length of flexible material 30. The length of material 30 has an elongated flexible outer sheet 32, an elongated flexible inner sheet 34 and an elongated flexible sheet of insulation 36 between sheets 32 and 34. The sheets 32, 34 and 36 are co-extensive and in overlying relation with one another. The length of material 30 is folded upon itself to provide the top, bottom and rear panels 12, 14 and 20.

The top panel 12 has a flexible outer cover layer 38, a flexible inner cover layer 40, and a flexible insulation layer 42, formed from portions of the outer sheet 32, inner sheet 34, and sheet of insulation 36, respectively.

The bottom panel 14 has a flexible outer cover layer 44, a flexible inner cover layer 46 and a flexible insulation layer 48, formed from the outer sheet 32, the inner sheet 34, and the sheet of insulation 36, respectively.

The rear panel 20 has a flexible outer cover layer 50, a flexible inner cover layer 52 and a flexible insulation layer 54, formed from the outer sheet 32, the inner sheet 34 and the sheet of insulation 36, respectively.

An extension of the bottom panel 14 provides a flap 62 which can be folded up over the top panel 12 to close the opening 22. The flap may be held closed as by cooperating strips 64 and 66 of hook and loop fasteners on the inner surface of the flap and on the outer surface of the outer cover layer 38 of the top panel 12.

Handles in the form of a pair of elongated straps 70 and 71 have their ends 72 and 73 secured to the outer surface of the outer cover layer 44 of the bottom panel. The handles 70 and 71 are closely spaced apart (about 4") at the center of the bag and are parallel to each other and preferably extend transversely of the bag, that is, parallel to the front and rear of the bag. The intermediate portions of the straps 70 and 71 are not secured, enabling a hand to be slipped under one strap and to grip the other strap while supporting the bag during delivery.

Figure 2:
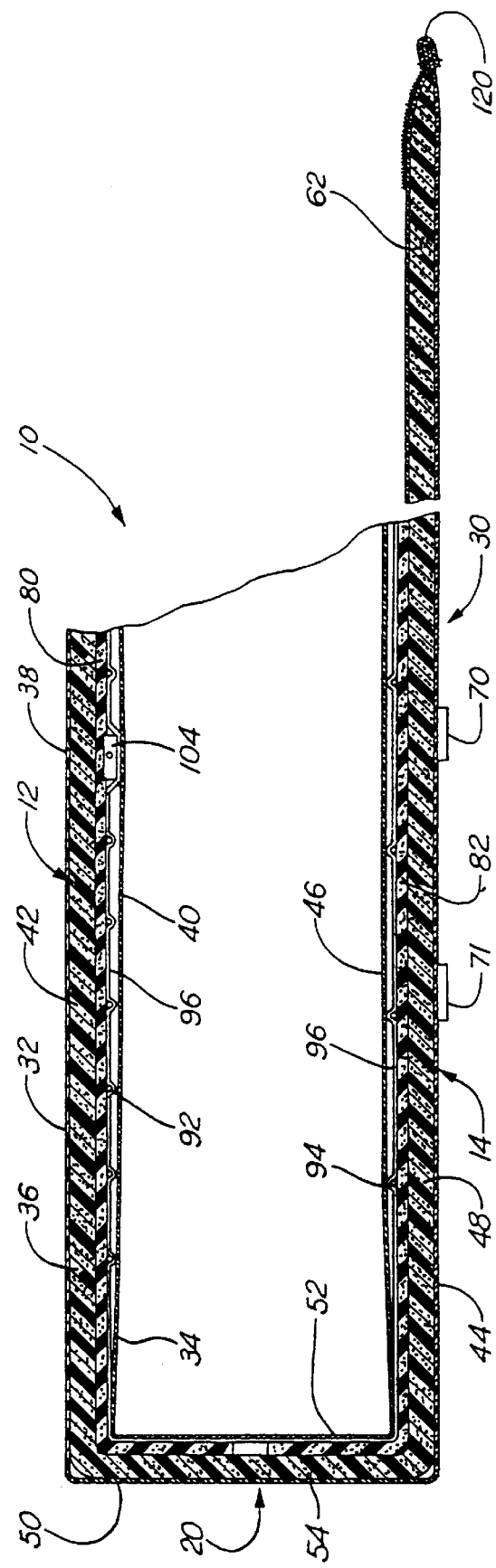
FIG. 2 is a sectional view taken on the line 2—2 in FIG. 1.
Figure 3:
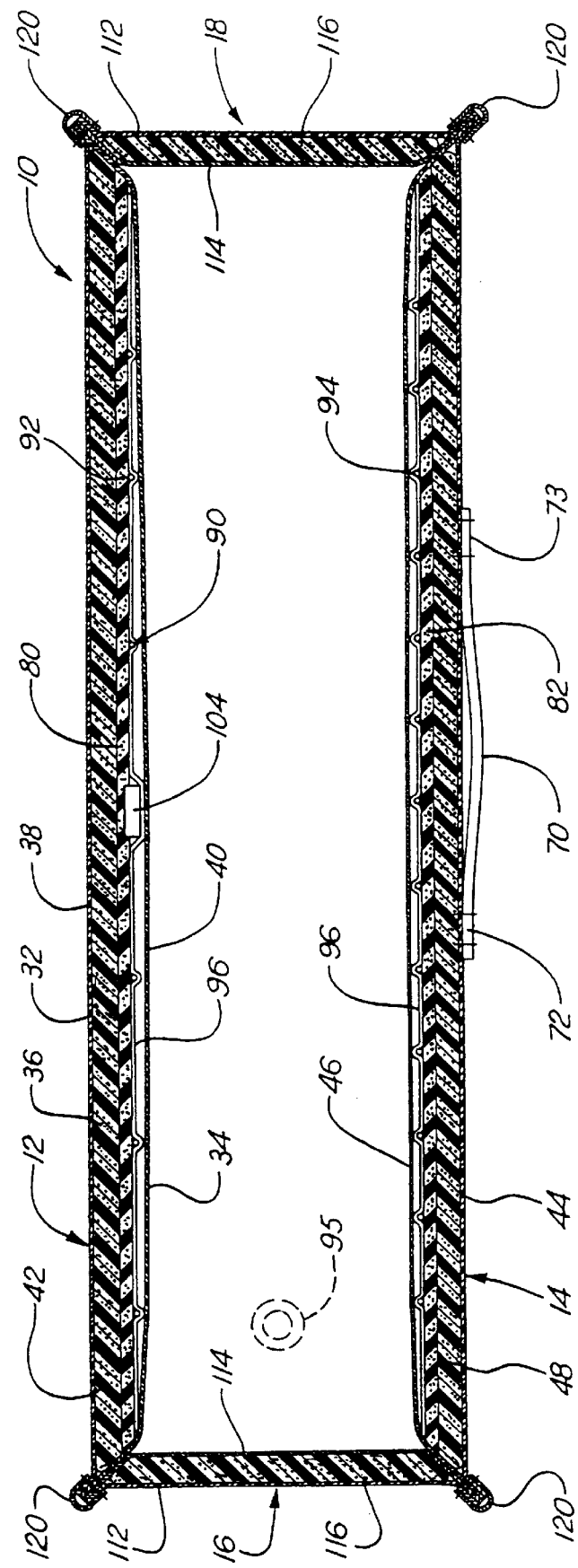
FIG. 3 is a sectional view taken on the line 3—3 in FIG. 1.
Figure 4:
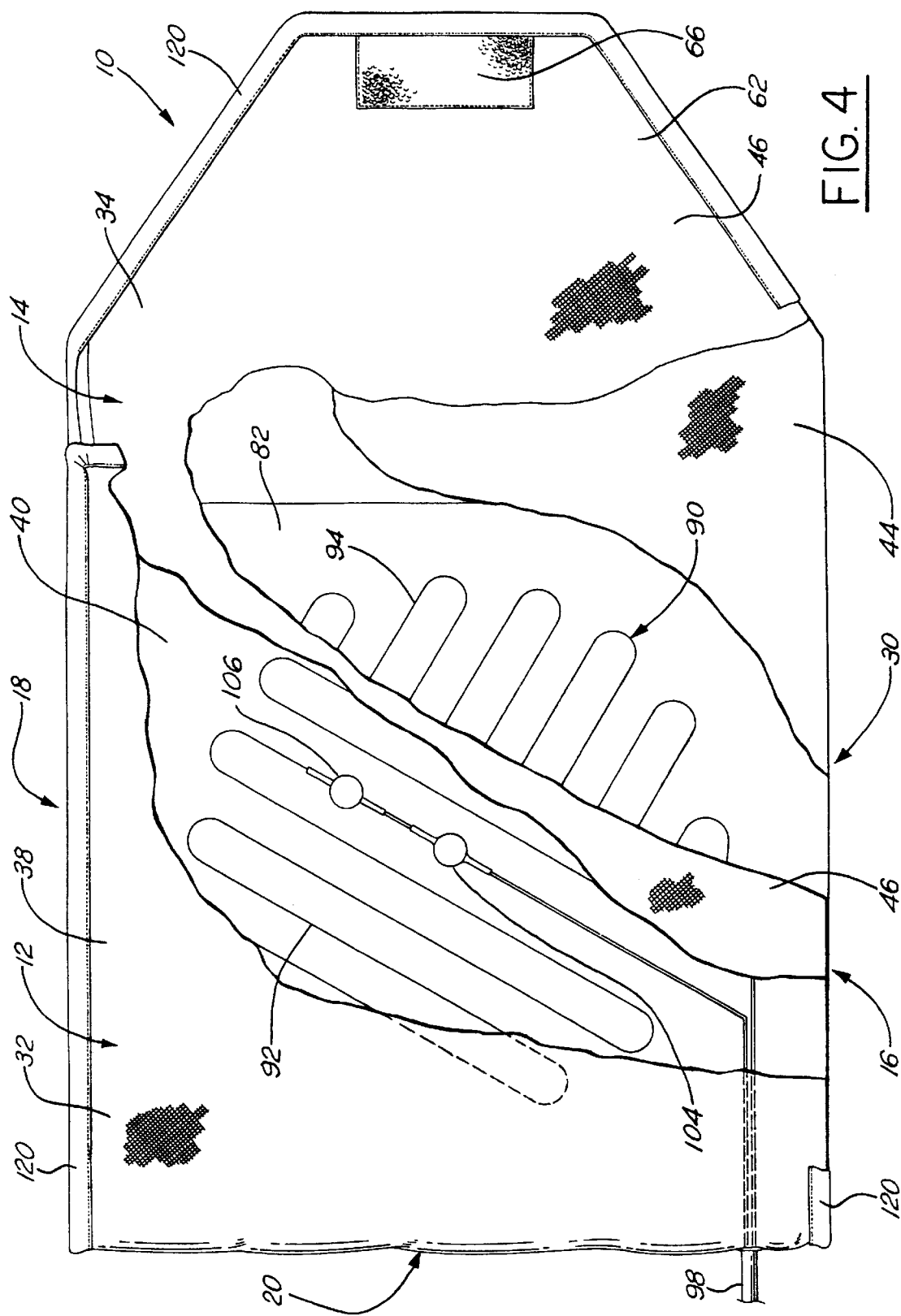
FIG. 4 is a top plan view of the thermal bag with parts broken away.

Between the layer of insulation 42 and the inner cover layer 40 of the top panel 12 is a rectangular layer of resinous plastic material 80, preferably polyurethane foam. Between the layer of insulation 48 and the inner cover layer 46 of the bottom panel 14 is a rectangular layer of resinous plastic material 82, also preferably polyurethane foam. The layer of foam in each of the top and bottom panels 12 and 14 is heat insulating and may be substantially co-extensive with the inner and outer cover layers and layer of insulation thereof. Alternatively, the foam layers 80 and 82 may extend into the rear panel as shown in FIG. 2.

Figure 5:
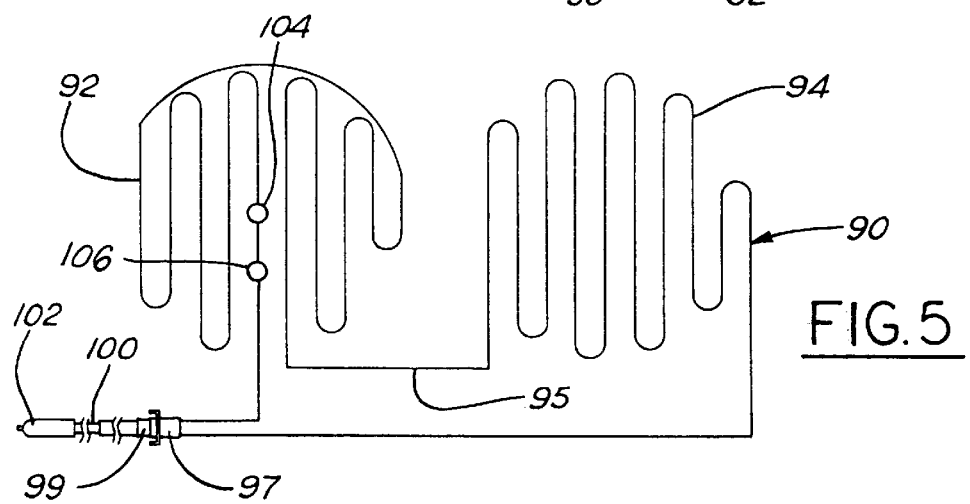
FIG. 5 is a diagrammatic view showing the heating elements.
Figure 6:
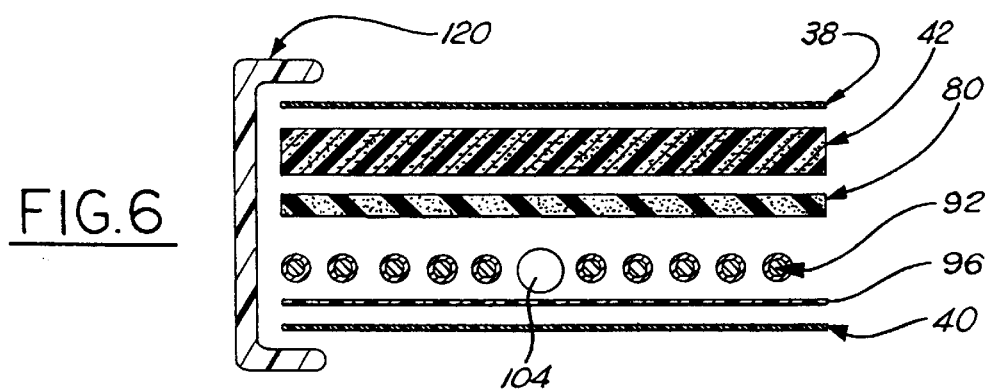
FIG. 6 is a diagrammatic, exploded, fragmentary sectional view showing the layers of the top panel.

Secured as by two layers of adhesive to the inner surfaces of each of the foam layers 80 and 82 is a single, elongated electric resistance wire 90 for providing heat to keep the contents of the bag warm. The wire 90 provides a heating element 92 in the top panel 12 and a heating element 94 in the bottom panel 14. A portion 95 of wire 90 in the rear panel 20 provides a series connection for the heating elements 92 and 94 as can be seen in FIG. 5. Each of the heating elements 92 and 94 are bent back and forth in a sinuous pattern so as to extend preferably over 50% or more of the rectangular area of each of the top and bottom panels. The entire wire 90, including the portions 92, 94 and 95 are covered with a coating of heat-insulating material, preferably made of a flouropolymer resin commonly known as Tefzel. Tefzel is preferred because of its low cost and high heat resistance. A rectangular backing layer 96 is adhered to the inner surface of each of the foam layers 80 and 82 over the heating element so that each heating element is sandwiched between the foam layer and the backing layer.

The two heating elements 92, 94 are connected to an electrical lead 98 which passes through an opening 95 in the rear panel 20 of the bag and terminates in a quick release connector 97. This connector is adapted to be coupled to a mating connector 99 on a power cord 100 which has a plug 102 on the other end for plugging into the cigarette lighter outlet in a delivery vehicle.

A thermostat 104 is provided in the top panel 12 which is set at an optimum temperature to insure that the contents of the bag will be kept warm but will not become overheated. The thermostat 104 is connected into the heating element 92 in the top panel 12 and controls the heat in both heating elements so that neither panel will become overheated. Preferably, the thermostat 104 is set to open, breaking the circuit to the heating elements, at a temperature of about 175° F., and to close, completing the circuit to the heating elements, at a temperature of about 160° F. to maintain the contents of the bag in the temperature range of 160° F. to 175° F.

Preferably, the thermostat 104 is located at the center of the top panel 12, that is, midway between the side edges and midway between the front and rear edges of the bag. This is considered the optimum position for heat control. While the thermostat may be placed elsewhere in the thermal bag, it is believed that there is less likelihood of overheating if the thermostat is centered in the top panel rather than being placed, for example, along a side edge of the bag or in the bottom panel.

A thermofuse 106 is connected into the heating wire 90, preferably in the heating element 92 of the wire 90, adjacent to the thermostat 104. The thermofuse 106 will break the circuit in the event of failure of the thermostat and accidental overheating of the heating wire to a temperature in excess of the maximum permitted by a properly functioning thermostat, and thereby protect the bag against possible damage or fire.

The side panels 16 and 18 are similar to the top and bottom panels of the thermal bag, except that they do not have heating elements. Thus, each side panel has an outer cover layer 112, and inner cover layer 114 and a sheet of insulation 116 between the cover layers. Preferably, these layers of the side panels are co-extensive with one another.

The top and bottom panels 12 and 14 and the rear panel 20 are secured to the side panels 16 and 18 by binding 120 which is stitched along the margins of the adjacent edges thereof. Similar binding is provided along the front edge of the top panel 12 to close the inner and outer cover layers and the intervening layer of insulation, and also along the edges of the flap 62.

Preferably, the outer and inner sheets 32, 34 112 and 114 are made of Nylon woven fabric which is durable, flexible, lightweight and easy to clean. The sheets of insulation 36 and 116 are preferably made of resin bonded Nylon or Polyester fiber, and the backing layers 96 are made of point bonded Nylon. The binding may be made of a heavy duty Nylon material. Other suitable materials may be used, if desired.

Figure 7:
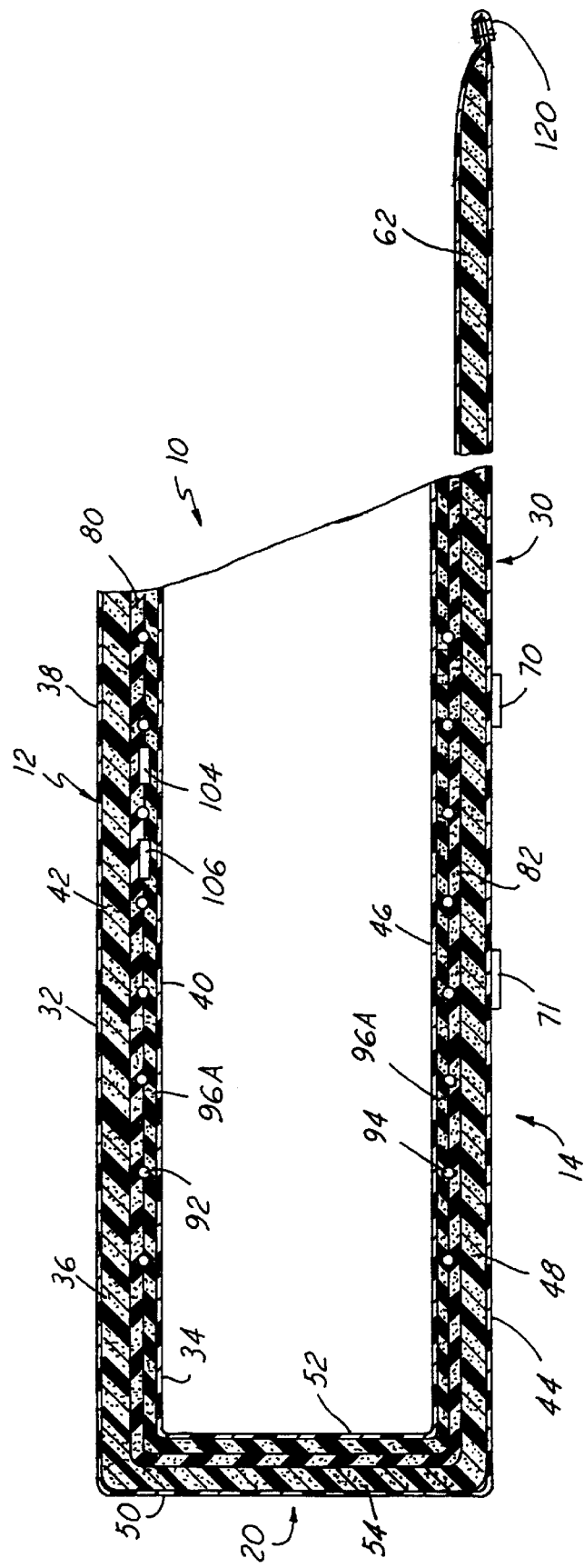
FIG. 7 is a view similar to FIG. 2 but shows a modification.

FIG. 7 shows a modification which differs from FIGS. 1–6 only in the material of the backing layers for the heating elements 92, 94 and 95. Whereas in FIGS. 1–6 the backing layers 96 are made of point bonded Nylon, in FIG. 7 the backing layers 96A are made of resinous plastic material, preferably polyurethane foam. The two foam layers 80, 96A and the two foam layers 82, 96A on opposite sides of the heating elements provide an envelope for the heating elements so that the heating elements may settle into the foam, especially if the layers 96A are soft, and be prevented from shifting. Adhesive is applied to the inner surfaces of the four layers 80, 82, 96A and 96A. The layers 80, 96A and the layers 82, 96A are bonded together with this adhesive, with the heating elements sandwiched between the bonded together layers. The adhesive bonding of the foam layers 80, 96A and the foam layers 82, 96A together will fill the cells of the foam providing an anchor for the adhesive and for the heating elements held by the adhesive.

Use of this bag insures that the pizza will stay hot and oven fresh on every delivery no matter what the weather, traffic conditions or delivery distance. The power cord is merely plugged into the cigarette lighter outlet. The quick release connector 97 is disconnected to remove the bag from the vehicle during the delivery process. The quick release connector 97 may also be plugged into a low voltage transformer in a restaurant where several bags may be kept warm before being used to carry a pizza in a delivery vehicle. The bag is very flexible, permitting it to be turned inside out to clean the inside of the bag.

What is claimed is:

1. A portable, flexible thermal bag having top and bottom panels, closed sides, one closed end and one open end for the insertion and removal of a food product, said top and bottom panels each having a flexible inner cover layer and a flexible outer cover layer and a flexible heat-insulating layer between said inner and outer cover layers, heating means comprising a first flexible heater in said top panel between the inner cover layer and heat-insulating layer thereof and a second flexible heater in said bottom panel between the inner cover layer and heat-insulating layer thereof, said heaters each comprising a flexible electrical resistance wire extending over a major portion of the extent of the respective top and bottom panels, said wires being connected to one another to provide an electrical heating circuit, first and second flexible heater support layers on opposite sides of the wire in said top panel to sandwich therebetween the wire in said top panel, third and fourth flexible heater support layers on opposite sides of the wire in said bottom panel to sandwich therebetween the wire in said bottom panel, said first and second heater support layers being adhered together by adhesive and said third and fourth layers being adhered together by adhesive, said heater support layers being made of resinous foam material such that the wires therebetween will settle into the foam and be prevented from shifting, the adhesive providing further resistance to shifting of the wires, a thermostatic control for said heating means located in said top panel between the first and second heater support layers approximately midway between the sides and midway between the ends of the bag, and means for releasably closing the open end of said bag, said bag being sufficiently flexible to permit it to be turned inside-out to facilitate cleaning of the bag.

2. A portable, flexible thermal bag according to claim 1, and further including a thermofuse in one of said resistance wires to open the electrical heating circuit in the event of overheating.

3. A portable, flexible thermal bag comprising a length of flexible material having a flexible inner sheet, a flexible outer sheet and a flexible sheet of heat insulation between said inner and outer sheets, said inner and outer sheets and said sheet of heat insulation being substantially co-extensive with one another, said length of material being folded upon itself to provide a flexible rectangular top panel, a flexible rectangular bottom panel and a flexible rectangular rear end panel, said panels each having flexible inner and outer cover layers and a flexible heat insulation layer therebetween formed from said respective inner and outer sheets and said sheet of insulation, each of said panels having opposite side edges, flexible side panels each having a flexible inner strip, a flexible outer strip and a flexible strip of insulation between said inner and outer strips, said inner and outer strips and said strip of insulation of each of said side panels being substantially co-extensive with one another, said inner and outer cover layers and said inner and outer strips being made of nylon, said side panels being secured on the side edges of said top, bottom and rear end panels, said panels cooperating to form said bag and provide said bag with a closed top, a closed bottom, closed sides, a closed rear end and an open front end for the insertion and removal of a food product, flexible heating means comprising a flexible first heater in said top panel between the inner cover layer and insulation layer thereof and a second flexible heater in said bottom panel between the inner cover layer and insulation layer thereof, said heaters each comprising a flexible electrical resistance wire extending over a major portion of the extent of said respective top and bottom panels, the wire of the heater in the top panel being connected to the wire of the heater in the bottom panel by a wire in said rear end panel to provide an electrical heating circuit, first and second flexible heater support layers on opposite sides of the wire in said top panel to sandwich therebetween the wire in said top panel, third and fourth flexible heater support layers on opposite sides of the wire in said bottom panel to sandwich therebetween the wire in said bottom panel, said first and second heater support layers being adhered together by adhesive and said third and fourth heater support layers being adhered together by adhesive, said heater support layers being made of resinous foam material such that the wires therebetween will settle into the foam and be prevented from shifting, the adhesive providing further resistance to shifting of the wires, a thermostatic control for said heating means located in said top panel between the first and second heater support layers approximately midway between the sides and midway between the ends of the bag, one of said top and bottom panels having an extension at the open end of the bag providing a flap adapted to be folded over the open end of the bag for closing the bag, and means releasably holding said flap folded over the open end of the bag, bag being sufficiently flexible to permit it to be turned inside-out to facilitate cleaning of the bag.

4. A portable, flexible thermal bag according to claim 3, and further including a thermofuse in one of said resistance wires to open said circuit in the event of overheating.

5. A portable, flexible thermal bag according to claim 4, wherein said wires are coated with Tefzel.

* * * * *